United States Patent
Gewecke

(10) Patent No.: US 8,644,486 B2
(45) Date of Patent: *Feb. 4, 2014

(54) METHOD AND SYSTEM TO PROXY PHONE DIRECTORIES

(75) Inventor: James Gewecke, San Antonio, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/474,215

(22) Filed: May 17, 2012

(65) Prior Publication Data

US 2012/0225642 A1 Sep. 6, 2012

Related U.S. Application Data

(63) Continuation of application No. 11/244,449, filed on Oct. 6, 2005, now Pat. No. 8,254,546.

(51) Int. Cl.
*H04M 3/42* (2006.01)

(52) U.S. Cl.
USPC ..................... 379/216.01; 455/415

(58) Field of Classification Search
USPC ............. 379/88.21, 142.01, 142.04, 142.06, 379/201.01, 216.01, 373.01; 370/353, 354, 370/352; 455/414.1, 415; 709/227
See application file for complete search history.

(56) References Cited

U.S. PATENT DOCUMENTS

| | | | |
|---|---|---|---|
| 5,274,693 A * | 12/1993 | Waldman | 455/564 |
| 6,324,396 B1 * | 11/2001 | Vasa et al. | 455/415 |
| 6,622,016 B1 * | 9/2003 | Sladek et al. | 455/414.1 |
| 6,662,006 B2 | 12/2003 | Glass | |
| 6,967,947 B1 * | 11/2005 | Chen et al. | 370/353 |
| 6,970,719 B1 * | 11/2005 | McConnell et al. | 455/554.1 |
| 7,031,747 B2 | 4/2006 | Cyr et al. | |
| 7,398,087 B1 * | 7/2008 | McConnell et al. | 455/435.1 |
| 7,747,282 B1 * | 6/2010 | Deichmann et al. | 455/558 |
| 2001/0053690 A1 * | 12/2001 | Inoue | 455/415 |
| 2002/0116558 A1 | 8/2002 | Wang | |
| 2002/0136380 A1 * | 9/2002 | Aoyama | 379/201.01 |
| 2002/0160760 A1 * | 10/2002 | Aoyama | 455/414 |
| 2002/0168968 A1 * | 11/2002 | Glass | 455/415 |
| 2002/0194183 A1 | 12/2002 | Yoakum et al. | |
| 2003/0007621 A1 * | 1/2003 | Graves et al. | 379/219 |
| 2003/0210678 A1 | 11/2003 | Haukka | |
| 2004/0187021 A1 | 9/2004 | Rasanen | |
| 2004/0249951 A1 * | 12/2004 | Grabelsky et al. | 709/227 |
| 2004/0264681 A1 | 12/2004 | Silver | |
| 2004/0266426 A1 * | 12/2004 | Marsh et al. | 455/426.2 |
| 2005/0058125 A1 | 3/2005 | Matikainen et al. | |

* cited by examiner

*Primary Examiner* — Khai N Nguyen
(74) *Attorney, Agent, or Firm* — Guntin & Gust, PLC; Ralph Trementozzi

(57) ABSTRACT

A method and system are disclosed to proxy mobile and network originated call sessions. A system that incorporates teachings of the present disclosure may include, for example, a method to access a phone directory using a mobile device including transmitting on a data channel of a wireless communications network a request for access to the phone directory, transmitting on the data channel one or more selective requests to search the phone directory, receiving on the data channel one or more successive portions of the phone directory according to the one or more selective requests, and transmitting on the data channel an abbreviated identifier associated with an entry of the phone directory for establishing voice communications with a terminal device. Other embodiments are disclosed.

20 Claims, 4 Drawing Sheets

METHOD AND SYSTEM TO PROXY PHONE DIRECTORIES

CROSS REFERENCE TO RELATED APPLICATIONS

This application is a continuation of U.S. patent application Ser. No. 11/244,449 filed Oct. 6, 2005, which is incorporated herein by reference in its entirety. This application is related to U.S. patent application Ser. No. 11/226,583 filed Sep. 14, 2005, by Doradla et al., entitled "Method and System to Proxy Mobile and Network Originated Call Sessions."

FIELD OF THE DISCLOSURE

The present disclosure relates generally to communication systems and more specifically to a method and system to proxy phone directories.

BACKGROUND

Convergence of wireless and wireline networks has been identified as an important strategic areas for many telecommunications providers. One of the key components in this convergence is service availability and seamlessness across multiple communication networks. For example, most mid to large-sized enterprises offer some form of abbreviated dialing by way of a PBX (Private Branch eXchange) system or a Centrex (Central Exchange). When an enterprise user, however, enters a cellular network with a mobile phone, abbreviated dialing services of the enterprise are no longer available.

Unfortunately, due to dissimilarity in technology implementation across wireless and wireline networks, and a lack of coordination between cellular operators and enterprises, very limited success has been achieved in the integration of these two environments.

The extension of the enterprise experience over a wide area is of great importance. It is not unusual for business travelers to spend considerable amounts of time traveling often having a need to be in contact with their companies. Any effort that eases the customer experience in favor of greater integration with their enterprise is therefore highly desirable.

DETAILED DESCRIPTION OF THE DRAWINGS

Figure 1:
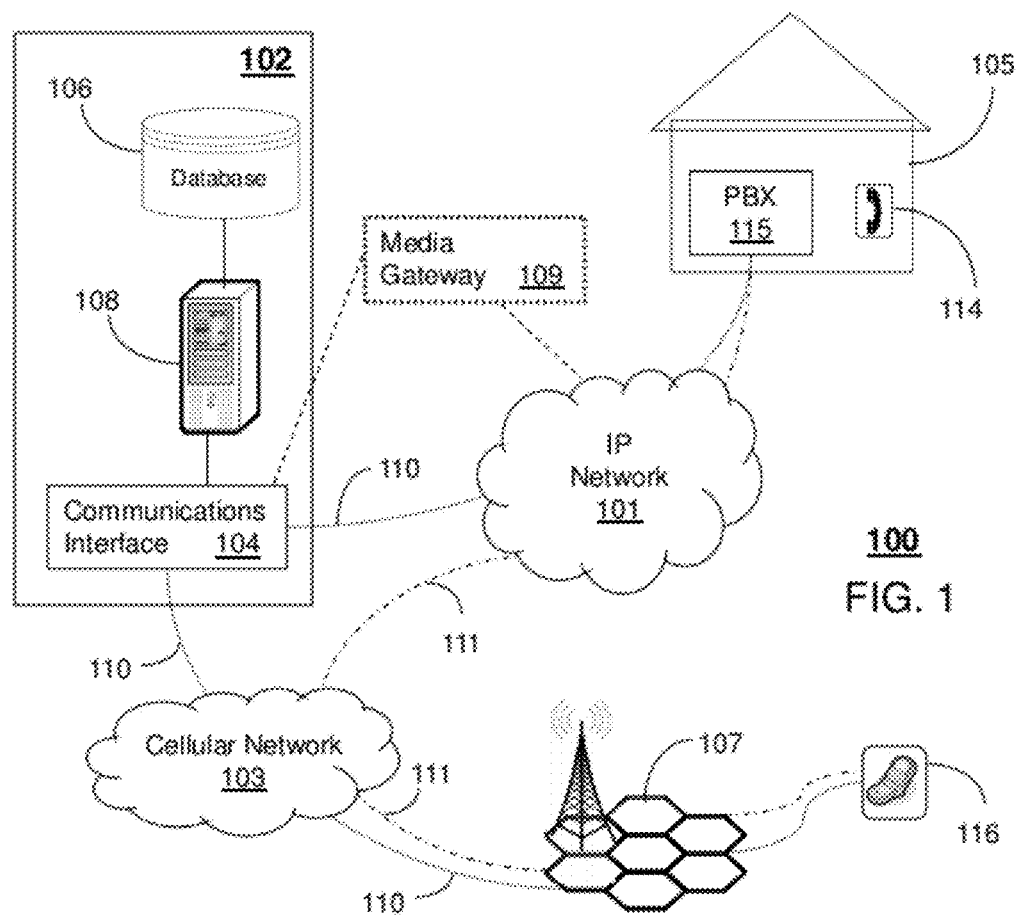
FIG. 1 is a block diagram of a communication system incorporating teachings of the present disclosure.

FIG. 1 is a block diagram of a communication system 100 incorporating teachings of the present disclosure. The communication system 100 comprises an IP (Internet Protocol) network 101 coupled to a phone directory proxy (PDP) 102, a cellular network 103 and an enterprise 105. The IP network 101 utilizes technology for transporting Internet traffic. The enterprise 105 can include a PBX 115 that provides connectivity services such as abbreviated dialing (e.g., 5-digit dialing) between terminal devices 114 (such as a Voice over IP phone) of enterprise personnel. Alternatively, the enterprise 105 can be coupled to a Centrex controllable by the PDP 102 as described below for supporting similar services as the PBX 115.

It will be appreciated by an artisan with ordinary skill in the art that the present disclosure and claims described below are not limited to an enterprise setting. That is, the PDP 102 can operate in a non-commercial setting such as for residential consumers or other non-commercial users who seek a similar experience as described herein. For illustration purposes only therefore, the following disclosure focuses on the enterprise setting. However, it would be apparent to said artisan that the claims described below can be applied to a non-commercial setting as well.

The PDP 102 comprises a communications interface 104 that utilizes common technology for communicating over an IP interface with the IP network 101, a media gateway 109, and/or the cellular network 103. The PDP 102 further comprises a memory 106 (such as a high capacity storage medium) embodied in this illustration as a database, and a controller 108 that makes use of computing technology such as a desktop computer, or scalable server for controlling operations of the PDP 102. The PDP 102 can operate as an IP Multimedia Subsystem (IMS) conforming in part to protocols defined by standards bodies such as 3GPP (Third Generation Partnership Protocol), and the claims described below.

Under the control of the PDP 102, the media gateway 109 can link packet-switched and circuit-switched technologies such as the cellular network 103 and the IP network 101, respectively. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication between the media gateway 109, which converts data from the format required for a circuit-switched network to that required for a packet-switched network. MGCP can therefore be used to set up, maintain, and terminate calls between multiple disparate communication elements.

The cellular network 103 utilizes circuit-switched technology supporting voice and data services such as GSM-GPRS, EDGE, CDMA-1X, UMTS, and other known technologies. The cellular network 103 is coupled to base stations 107 under a frequency-reuse environment for communicating over-the-air with roaming mobile devices 116.

Figure 2:
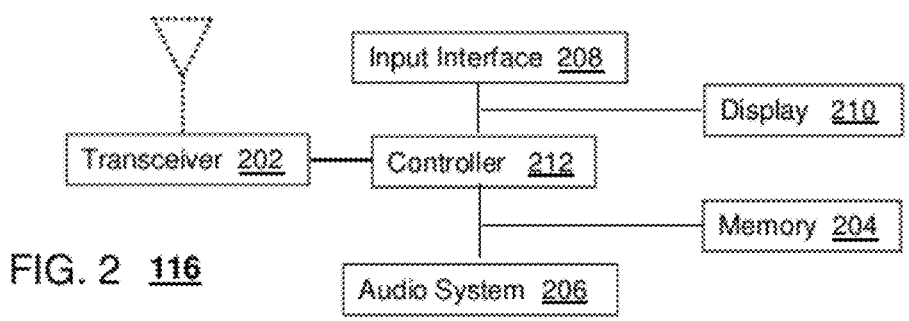
FIG. 2 is a block diagram of a mobile device incorporating teachings of the present disclosure.

FIG. 2 is a block diagram of the mobile device 116 incorporating teachings of the present disclosure. The mobile device 116 utilizes technology such as a wireless transceiver 202, a memory 204, an audio system 206, an input interface 208, a display 210, and a controller 212. The wireless transceiver 202 utilizes technology for exchanging voice and data messages with the base stations 107, which relay said messages to targeted end users. In an embodiment where the mobile device 116 is a multi-mode communication device, the wireless transceiver 202 can include technology for wireline communications (such as POTS—Plain Old Telephone Service), WiFi, WiMax, and so on. In a multi-functional embodiment, the mobile device can also serve as terminal device 114 of the enterprise 105. That is, when the mobile device 116 is within the premises of the enterprise 105 it functions as a POTS wireline device, or an IP-based device over Ethernet or WiFi. When roaming outside the enterprise the mobile device 116 functions as a wireless communication device on the external cellular network.

The controller 212 utilizes computing technology such as a microprocessor and/or digital signal processor for controlling the operations of the mobile device 116 according to the present disclosure. The memory 204 comprises storage devices such as RAM, SRAM, DRAM, and/or Flash memories. The audio system 206 includes audio technology for intercepting audio signals from a user and for conveying audio signals received by the mobile device 116. The input interface 208 can be a keypad with navigation and alphanumeric functionality accessible by the user for manipulating graphical and textual presentations made on the display 210. The display 210 can utilize common technology such as a color thin film transistor liquid crystal display (TFT LCD).

It would be apparent to one of ordinary skill in the art that the communication technologies illustrated in FIG. 1 can be modified without departing from the scope and spirit of the claims described below. For instance, the cellular network 103 can be replaced with a WiFi or WiMax network without departing from the teachings of the present disclosure and the claims described herein.

Figure 3:
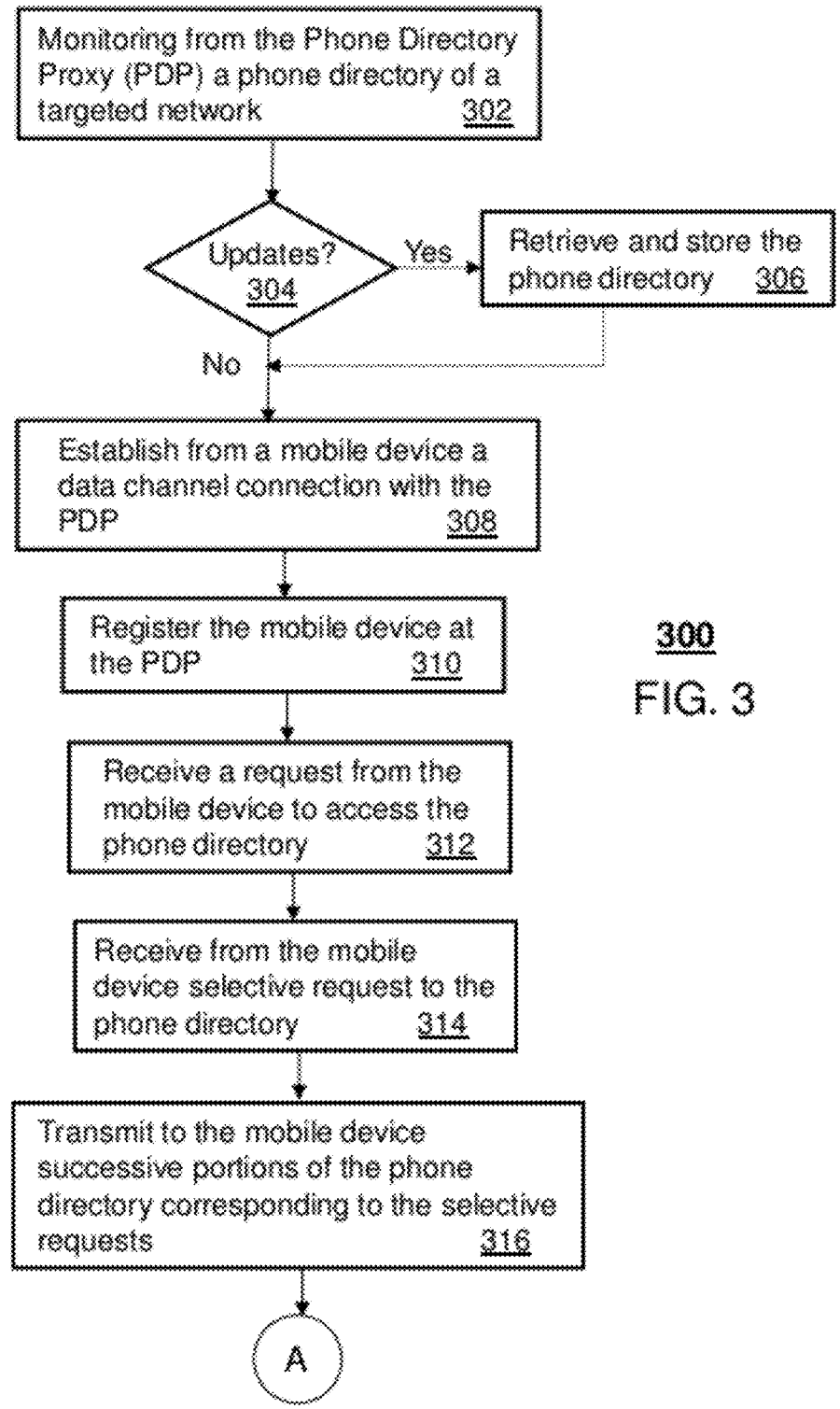
FIGS. 3-4 depict a flowchart of a method operating in the communication system according to teachings of the present disclosure.
Figure 4:
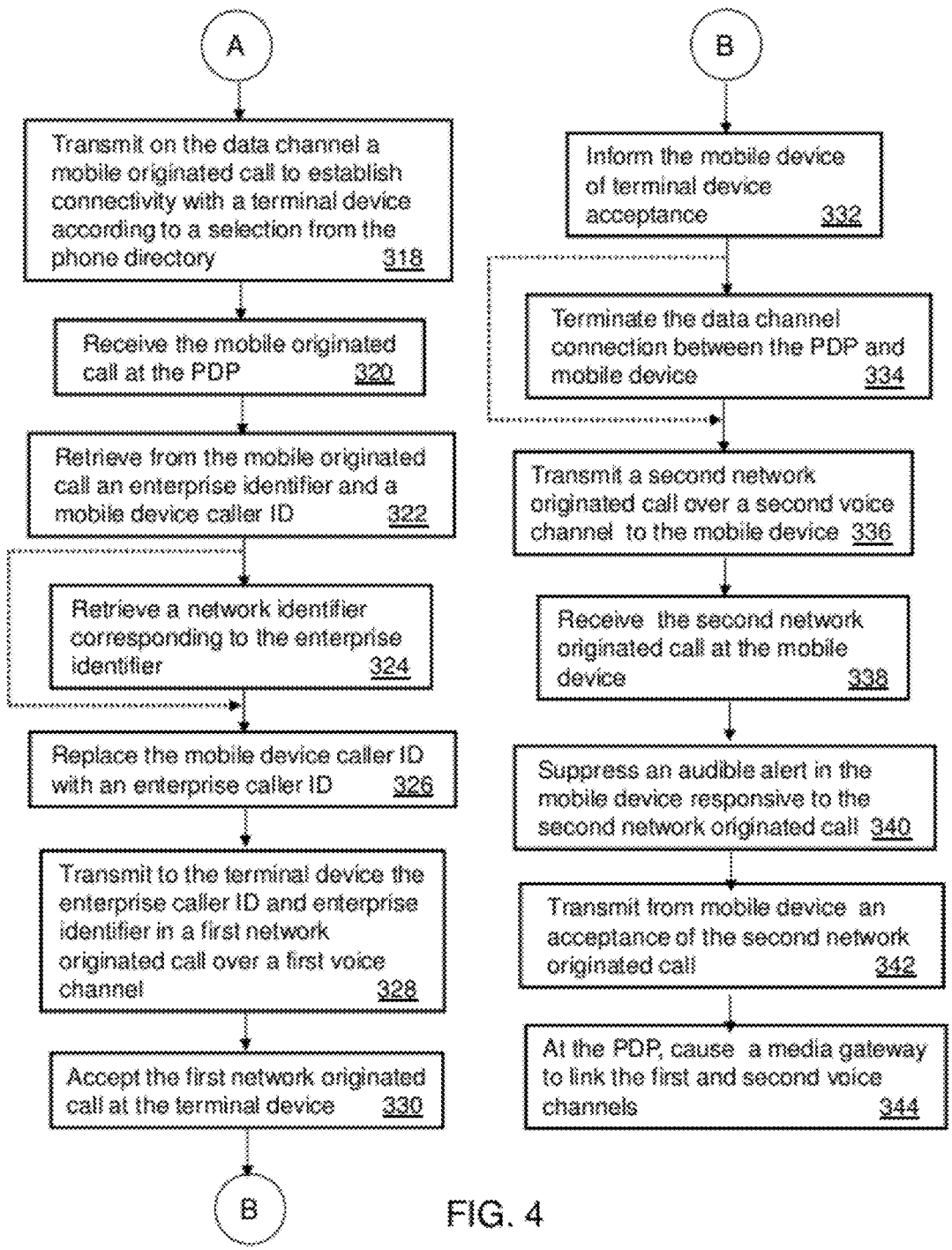

With this in mind, FIGS. 3-4 depict a flowchart of a method 300 operating in the communication system 100 according to the teachings of the present disclosure. Generally speaking, method 300 describes a process for simulating a seamless phone directory, and for simulating a mobile originated call as a network originated call according to a selected identifier of the phone directory.

Method 300 begins with step 302 where the PDP 102 monitors a phone directory of a targeted network. The phone directory can originate from a commercial enterprise, and/or white pages of the communication system 100. In step 304, the PDP 102 checks for updates to the phone directory. If there is an update, the PDP 102 proceeds to step 306 where it retrieves the phone directory in whole or in part and stores it in its memory, thereby synchronizing an available prior copy. For very large phone directories, the PDP 102 can alternatively retrieve portions of the phone directory as needed. Steps 302 through 306 can operate as a background process of the PDP 102, while steps 308 through 344 can operate as a foreground process for supporting the needs of mobile device users.

In step 308, the mobile device 116 establishes a data channel connection with the PDP 102. This step can be in response to a user selecting an option in the mobile device 116 to view a particular phone directory of the communication system 100 (such as that of an enterprise or the public white pages). The data connection can be, for instance, a GPRS session in which IP packets are exchanged between the mobile device 116 and the PDP 102. Upon establishing this connection, in step 310 the PDP 102 registers the mobile device 116. The registration process can include identifying the mobile device 116 as a known user and extracting account information relating thereto from its database 106. The account information can indicate, for example, that the mobile device user is a member of enterprise 105. The database 106 can further include enterprise identifiers in the phone directory for conducting abbreviated dialing with personnel of the enterprise 105.

In step 312 the PDP 102 receives a request from the mobile device 116 to access the phone directory. From this step the mobile device 116 can be presented a graphical "find screen" on the display 210 for searching individuals in the phone directory. For each search instance made by the end user of the mobile device 116, a selective request is transmitted in step 314 to the PDP 102 corresponding to said search. The PDP 102 in turn transmits in step 316 successive portions of the phone directory corresponding to the selective requests received.

Once the end user of the mobile device 116 has selected by way of the input interface 208 a targeted individual to call, the mobile device 116 transmits in step 318 to the PDP 102 over the data channel (such as GPRS, EDGE, CDMA-1X, UMTS etc.) details relating to a mobile originated (MO) call to establish connectivity with a terminal device 114 corresponding to the targeted individual (see FIG. 4). As part of the MO call, the mobile device 116 can utilize a 10-digit number or abbreviated enterprise identifier such as 6-5555 for the terminal device 114 as provided by the selectable portion of the phone directory presented on the display 210. As noted earlier, the terminal device 114 can be an enterprise user or a non-enterprise user. In either case the terminal device 114 can be any one of a variety of devices including, but not limited to, a POTS (Plain Old Telephone Service) phone, VoIP phone, wireless device, etc.

As just noted, step 318 can be in response to a user of the mobile device 116 desiring to communicate with an enterprise user as if the mobile user were making the call within the enterprise 105. The PDP 102 receives the MO call in step 320, and in step 322 retrieves from the MO call the enterprise identifier and a mobile device caller ID. If the received enterprise identifier is a 10-digit number, the PDP 102 skips over step 324 to step 326. Otherwise, the PDP 102 proceeds to step 324 where it retrieves a network identifier comprising a 10-digit number (e.g., 333-444-5555) corresponding to the abbreviated enterprise identifier of 6-5555.

As a supplemental embodiment, n step 326 the PDP 102 can replace the mobile device caller ID with an enterprise caller ID to emulate a caller ID originating from mobile user's office in the enterprise 105. In step 328, the PDP 102 transmits a first network originated call to the targeted terminal device 114 with the enterprise caller ID using the network identifier (i.e., 333-444-5555). The first network originating call represents the initial step in establishing of a voice call with a terminal device 114 of an enterprise (or non-enterprise) user. When the terminal device 114 accepts the call in step 330, the PDP 102 proceeds to step 332 where it informs the mobile device 116 of the acceptance. Thereafter in step 334, the mobile device 116 and the PDP 102 terminate the data connection. If, however, the mobile device 116 can support simultaneous voice and data connections, step 334 can be skipped, thereby providing the PDP 102 and mobile device 116 a means to exchange further information such as telemetry information, billing information, or otherwise.

In step 336, the PDP 102 transmits a second network originated call over a second voice channel to the mobile device 116 utilizing a signaling protocol such as SS7 (Signaling System 7). In step 338, the mobile device 116 receives the second network originated call. The mobile device 116 in step 340 suppresses an audible alert typically generated by the audio system 206 so as to not confuse the user of the mobile device 116 who initiated the call. In step 342, the mobile device 116 automatically informs the PDP 102 that it has accepted the call. In step 344, the PDP 102 calls upon the media gateway 109 to link the first and second voice channels by patching bearer sessions between the circuit-switched cellular network 103 and the VoIP terminal device 114 utilizing RTP (Real-time Transport Protocol) over the IP network 101 on link 111. At this point the mobile user and the targeted enterprise (or non-enterprise) user can conduct a conversation.

The aforementioned steps occur rapidly so that it would be imperceptible to either of the mobile and enterprise users that multiple calls sessions have taken place. Furthermore, the aforementioned steps can be implemented with computer instructions operating in part at the PDP 102 and as a client in the mobile device 102, respectively. It should also be noted that method 300 and its variants can be employed in portions of the communication system 100 of FIG. 1 with minimal impact to the suppliers of legacy technologies illustrated therein.

It should be again emphasized that although the above description focuses on an enterprise setting, non-commercial settings are within the scope and spirit of the claims described below. It would be evident to an artisan with ordinary skill in the art that an exchange system such as a PBX or Centrex is an unnecessary element in view of the claims below. For example, the transactions described in method 300 can take place directly between the PDP 102, the mobile device 116, and the terminal device 114 without interaction with a private exchange, or other networking element so long as a communication medium interconnecting the PDP 102, the mobile device 116, and the terminal device 114 facilitates said transactions. It would also be evident to said artisan that the voice channels described in the present disclosure can be IP-based voice channels, non-IP-based voice channels (such as circuit switched communications), or combinations thereof.

Figure 5:
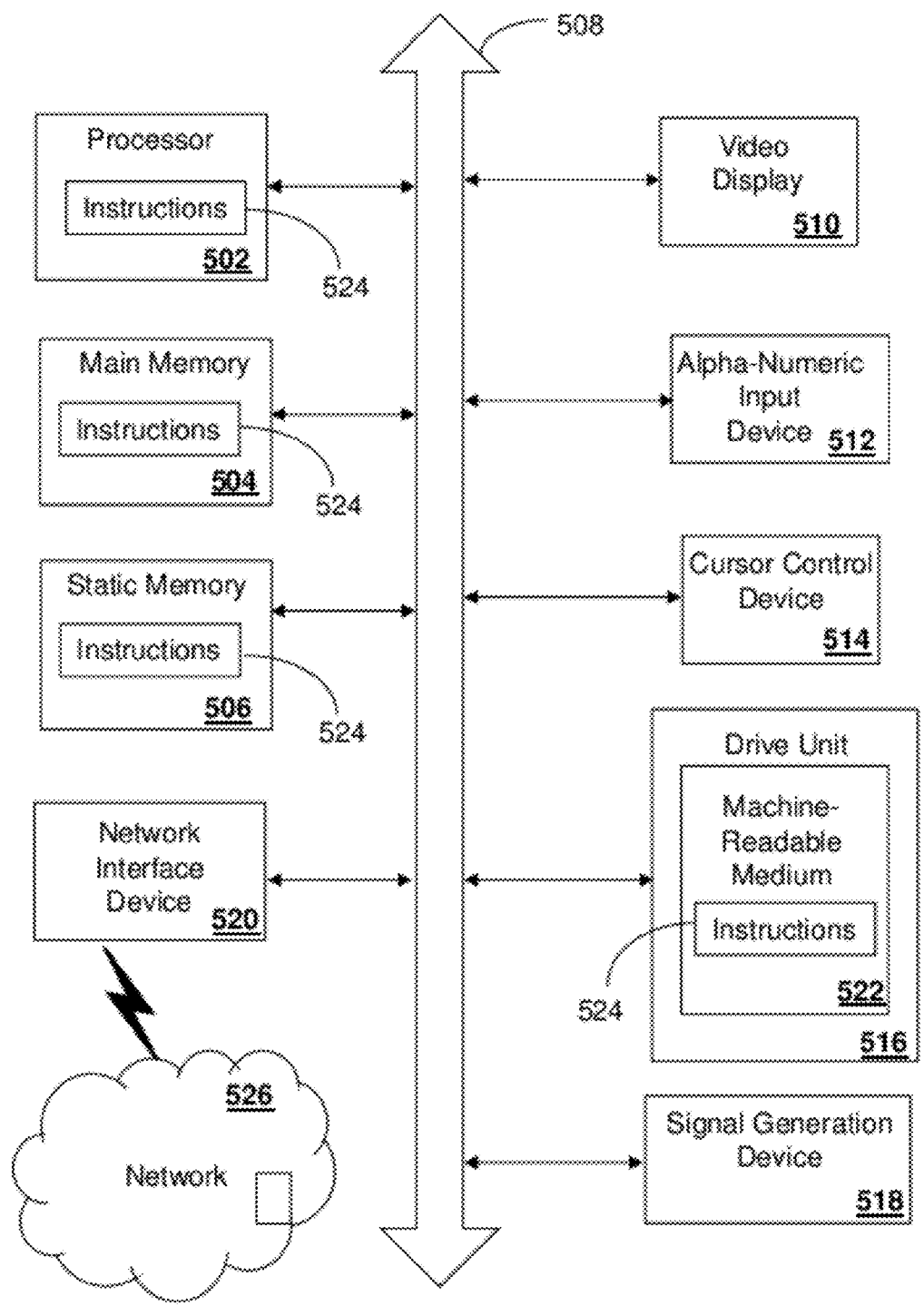
FIG. 5 is a diagrammatic representation of a machine in the form of a computer system within which a set of instructions, when executed, may cause the machine to perform any one or more of the methodologies discussed herein.

FIG. 5 is a diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network element, comprising:
   a memory to store executable instructions; and
   a controller coupled to the memory, wherein the controller, responsive to executing the instructions, performs operations comprising:
   receiving from a portable device having an associated mobile device caller identification, a request for access to a phone directory;
   receiving a selective request from the portable device to search the phone directory;
   receiving from the portable device a mobile originated call comprising an abbreviated phone number associated with an entry of the phone directory to establish communications with a communication device;
   identifying an unabbreviated phone number associated with the abbreviated phone number;
   replacing the mobile device caller identification with an enterprise caller identification;
   initiating a first network originated call to the communication device over a first channel according to the unabbreviated phone number, wherein the first network originated call comprises a caller identification associated with the portable device, and wherein the caller identification comprises the enterprise caller identification;
   initiating a second network originated call to the portable device over a second channel, wherein the portable device suppresses an audible alert associated with the second network originated call; and
   linking the first and second channels to enable communications between the portable device and the communication device.

2. The network element of claim 1, wherein the communication device is a portable communication device, and wherein the network element is a server.

3. The network element of claim 1, wherein the controller, responsive to executing the instructions, performs operations comprising:
   receiving a registration request from the portable device on a data channel; and
   registering the portable device wherein a registration process includes obtaining account information from the portable device including information that the portable device is owned by an enterprise that manages content in the phone directory.

4. The network element of claim 1, wherein the controller, responsive to executing the instructions, performs operations comprising:
   receiving a connection acceptance from the communication device; and
   receiving a connection acceptance from the portable device.

5. The network element of claim 1, wherein the unabbreviated phone number comprises an enterprise identifier stored in the phone directory.

6. The network element of claim 1, wherein the first and the second channels are linked by way of a media gateway.

7. The network element of claim 1, wherein the network element operates in an internet protocol multimedia subsystem network.

8. The network element of claim 1, wherein the controller, responsive to executing the instructions, performs operations comprising:
   accessing the phone directory at an enterprise server; and
   storing a portion of the phone directory.

9. A non-transitory machine-readable storage medium, comprising executable instructions which, responsive to being executed by a processor, cause the processor to perform operations comprising:
   transmitting, by a mobile device having an associated device caller identification not associated with an enterprise, to a server a request for access to a phone directory;
   receiving, by the mobile device, from the server a portion of the phone directory;
   transmitting, by the mobile device, to the server an abbreviated phone number corresponding to a selection from the phone directory to establish communications with a communication device to cause the server to replace the device caller identification with an enterprise caller identification;
   receiving, by the mobile device, from the server a first network originated call responsive to the server establishing a second network originating call that presents to the communication device the enterprise caller identification that differs from the associated device caller identification assigned to the mobile device, wherein the second network originating call appears to have originated from within the enterprise;

accepting, by the mobile device, the first network originated call and suppressing an audible alert that would have been initiated upon receiving the first network originated call; and facilitating, by the mobile device, establishment of communications with the communication device responsive to the server linking the first and second network originated calls.

10. The non-transitory machine-readable storage medium of claim 9, wherein the communication device is a portable communication device.

11. The non-transitory machine-readable storage medium of claim 9, wherein the transmitting of the abbreviated phone number causes the server to substitute the abbreviated phone number with the enterprise identifier associated with the communication device.

12. The non-transitory machine-readable storage medium of claim 9, wherein the mobile device is a cellular telephone.

13. A method, comprising:
facilitating, by a first communication device having a processor and an associated device caller identification not associated with an enterprise, establishment of communications with a server;

transmitting, by the first communication device, to the server a request for access to a phone directory;

obtaining, by the first communication device, from the server, access to the phone directory;

initiating, by the first communication device, an originated call request directed to the server comprising an abbreviated identifier associated with an entry of the phone directory to cause the server to replace the device caller identification with an enterprise caller identification and to initiate a first network originated call to establish communications with a second communication device over a first channel;

detecting, by the first communication device, a second network originated call initiated by the server over a second channel, wherein the second network originated call, according to the enterprise caller identification, appears to have originated from within the enterprise;

accepting, by the first communication device, the second network originated call; and suppressing, by the first communication device, an audible alert upon receiving the second network originated call.

14. The method of claim 13, wherein the first communication device is a mobile communication device.

15. The method of claim 13, wherein the second communication device is a mobile communication device.

16. The method of claim 13, wherein the accepting, by the first communication device, of the second network originated call comprises accepting the second network originated call without user input.

17. The method of claim 13, wherein the initiating, by the first communication device, of the originated call request directed to the server comprising an abbreviated identifier causes the server to retrieve an enterprise identifier associated with the second communication device.

18. The method of claim 13, wherein the server initiates the second network originated call responsive to initiating the first network originated call.

19. The method of claim 13, wherein the facilitating, by the first communication device, establishment of communications with the server is over a data channel.

20. The method of claim 19, comprising detecting, by the first communication device, a termination of the data channel by the server responsive to the server linking the first and the second channels.

* * * * *